United States Patent
Folliot et al.

(10) Patent No.: US 6,839,207 B2
(45) Date of Patent: Jan. 4, 2005

(54) PROTECTION SYSTEM FOR PROTECTING A POLY-PHASE DISTRIBUTION TRANSFORMER INSULATED IN A LIQUID DIELECTRIC, THE SYSTEM INCLUDING AT LEAST ONE PHASE DISCONNECTOR SWITCH

(75) Inventors: Philippe Folliot, Oissel (FR); Stéphane Melquiond, Villetelle (FR); François Hebert, Boos (FR); Patrice Grave, Maneglise (FR)

(73) Assignee: Alstom, Paris (FR)

( * ) Notice: Subject to any disclaimer, the term of this patent is extended or adjusted under 35 U.S.C. 154(b) by 165 days.

(21) Appl. No.: 10/274,406

(22) Filed: Oct. 21, 2002

(65) Prior Publication Data

US 2003/0086218 A1 May 8, 2003

(30) Foreign Application Priority Data

Oct. 22, 2001 (FR) .......................................... 01 13572

(51) Int. Cl.$^7$ ............................................. H02H 7/04
(52) U.S. Cl. ........................................ 361/38; 361/35
(58) Field of Search .......................... 361/35, 37, 38, 361/39, 41, 93.1, 93.8, 93.9, 103, 104

(56) References Cited

U.S. PATENT DOCUMENTS

| | | | | |
|---|---|---|---|---|
| 1,989,485 A | * | 1/1935 | Marti ........................... | 363/52 |
| 2,351,969 A | * | 6/1944 | Hurst ........................... | 337/239 |
| 4,223,364 A | * | 9/1980 | Sangster ....................... | 361/37 |
| 5,898,556 A | * | 4/1999 | de Sedouy et al. ........... | 361/37 |
| 6,479,780 B2 | * | 11/2002 | Virtanen et al. ............. | 218/154 |

FOREIGN PATENT DOCUMENTS

EP  1 102 379 A  5/2001  ............ H02H/7/04

* cited by examiner

Primary Examiner—Ronald Leja
(74) Attorney, Agent, or Firm—Sughrue Mion, PLLC

(57) ABSTRACT

The distribution transformer is installed in a station having N phases, at least N-1 phases being equipped on the high-voltage side of the transformer with respective current-limiting fuses capable of blowing in the event of a dead short circuit between the phases. The protection system includes: at least one fault detector for detecting faults on the basis of at least one of the following indicators: pressure in the tank, level of the dielectric, or temperature of the transformer; a short-circuiter acting on all the phases situated upstream from the high-voltage windings, said short-circuiter being capable of being triggered by said fault detector to establish a dead short circuit between the phases; and on at least N-1 phases, a detector for detecting an abnormal current upstream from the transformer, said detector being associated with a controller for controlling said short-circuiter. In the system, at least the phase that is not equipped with a limiting fuse is equipped with a disconnector switch which is normally closed in the absence of any fault, said disconnector switch being disposed on the high-voltage side of the transformer upstream from the short-circuiter, and opening thereof being triggered by the short-circuiter in the event of a fault, but with a certain delay.

12 Claims, 4 Drawing Sheets

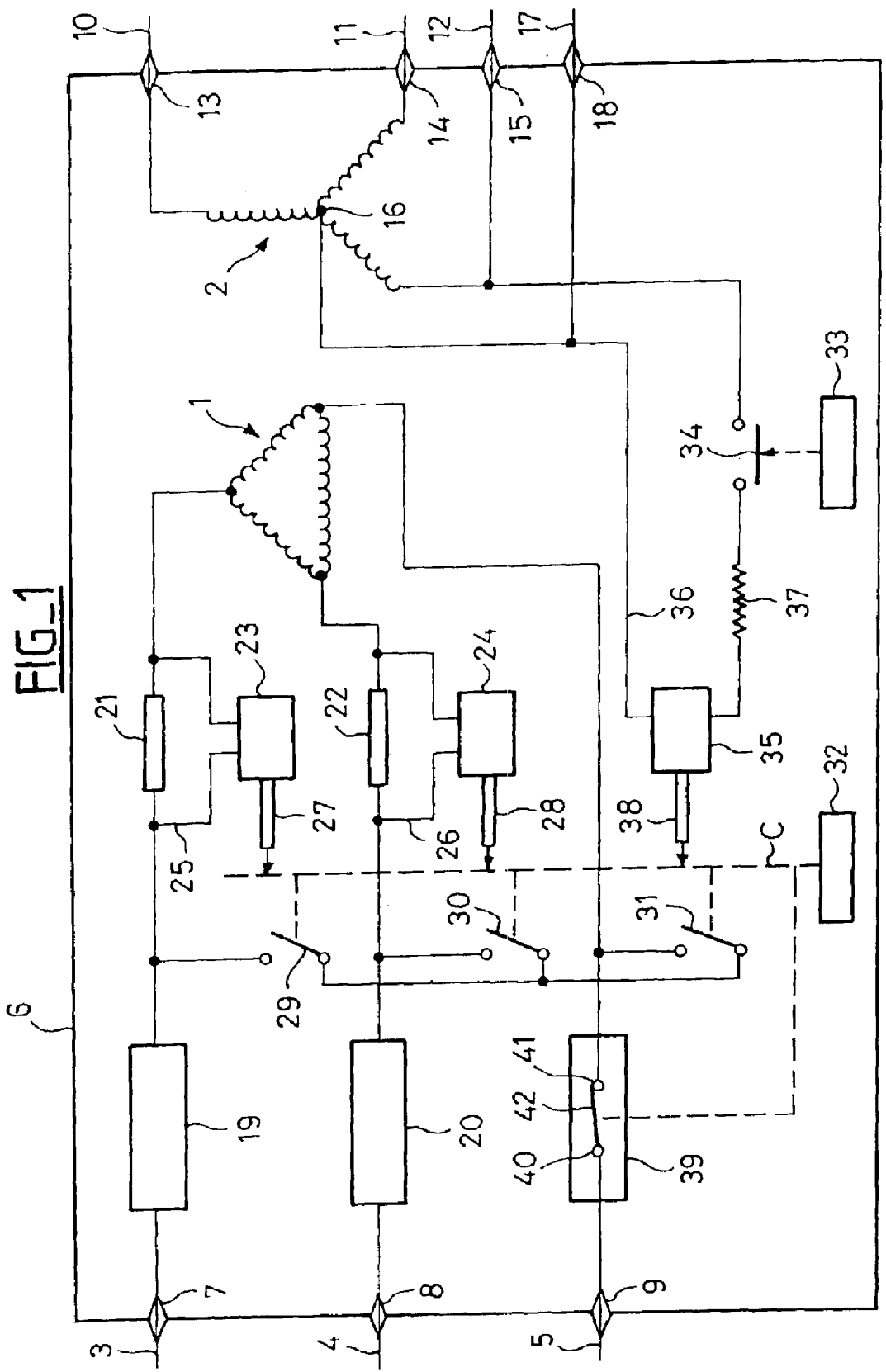
FIG_1

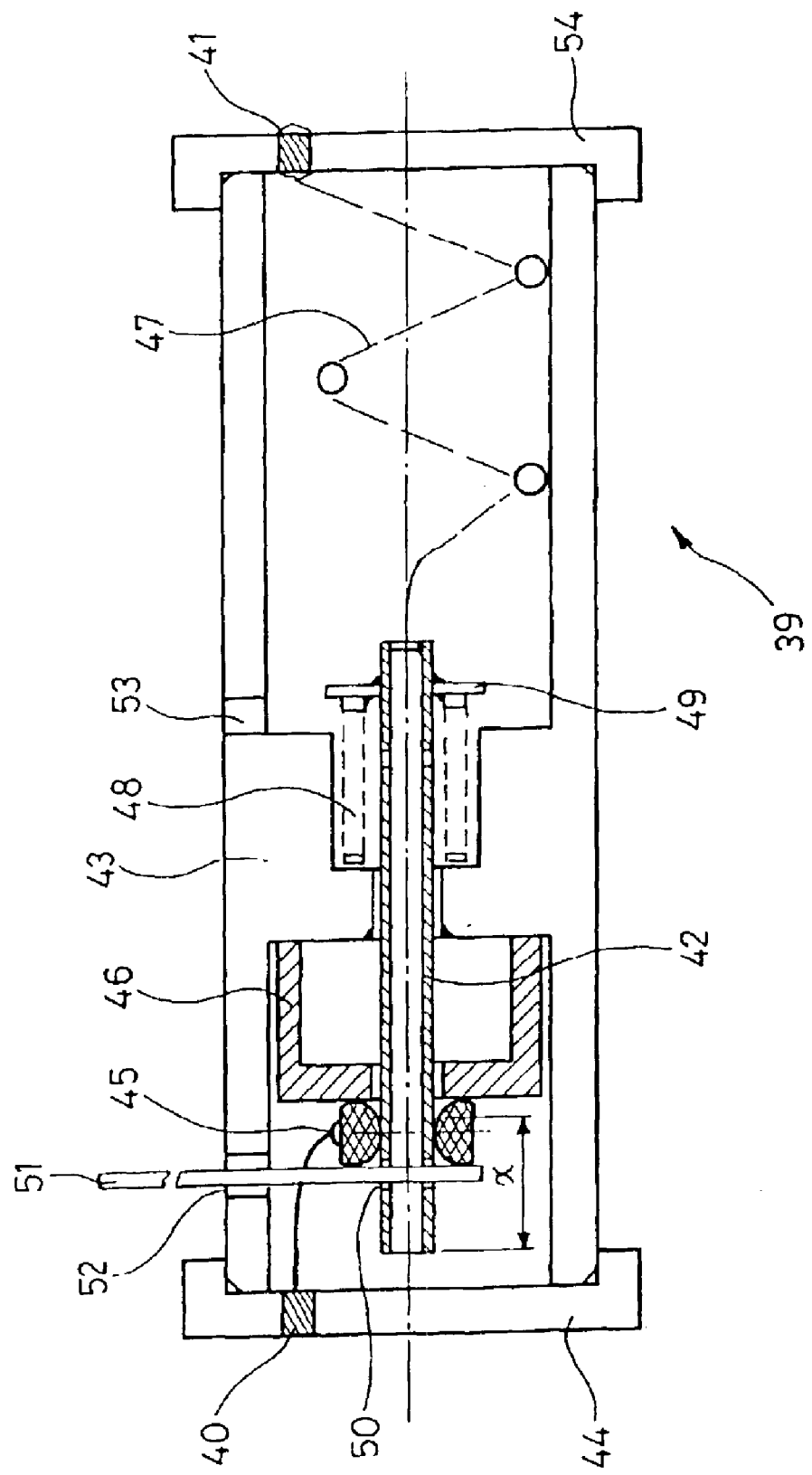
FIG_2

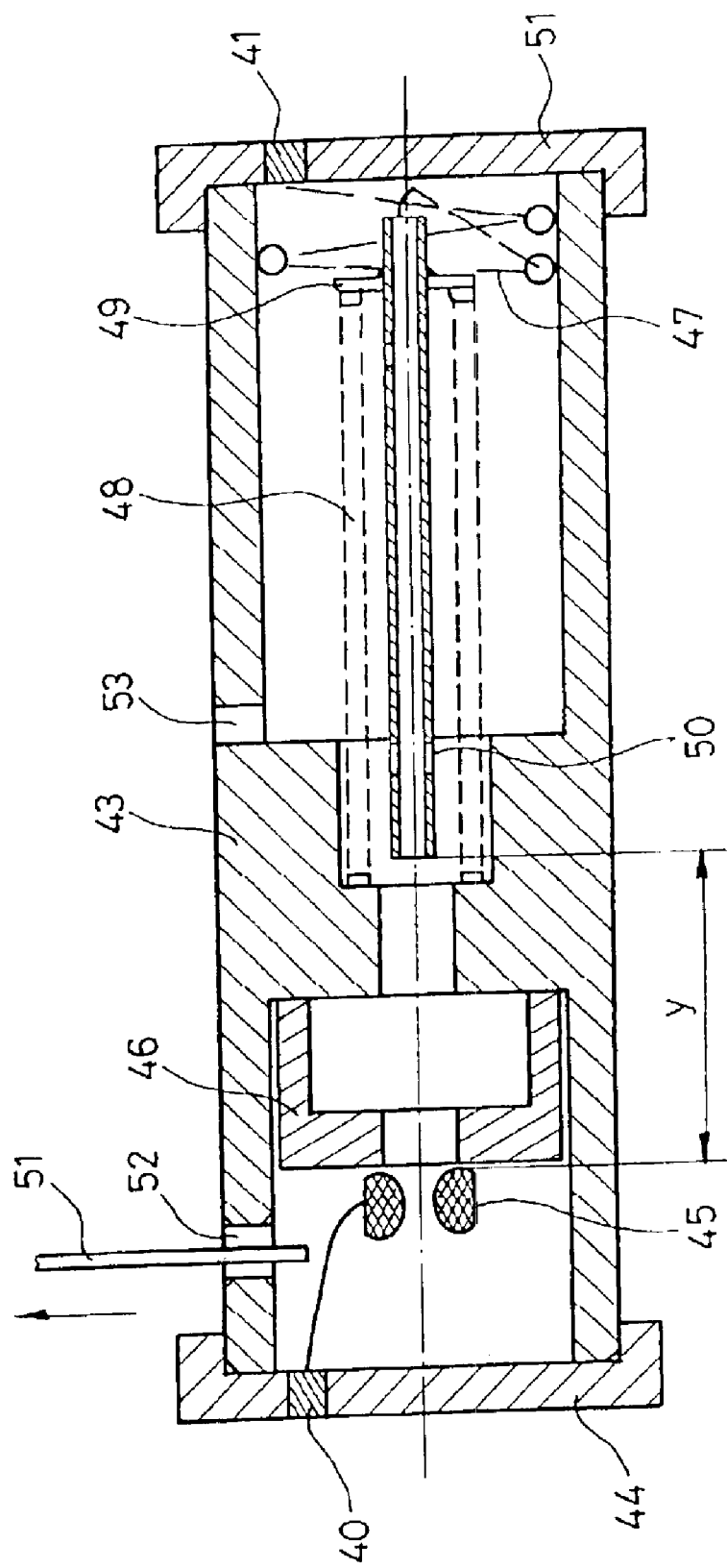
FIG_3

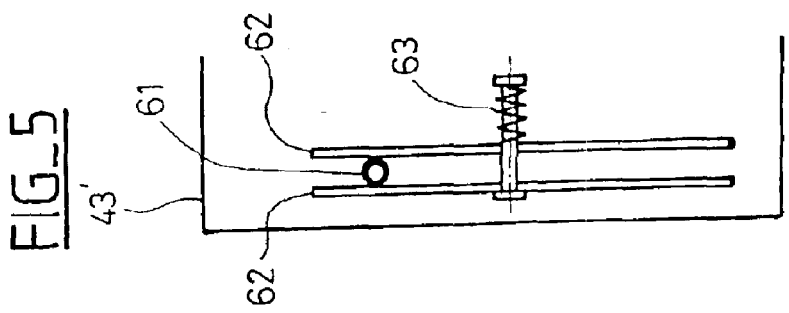
FIG_5
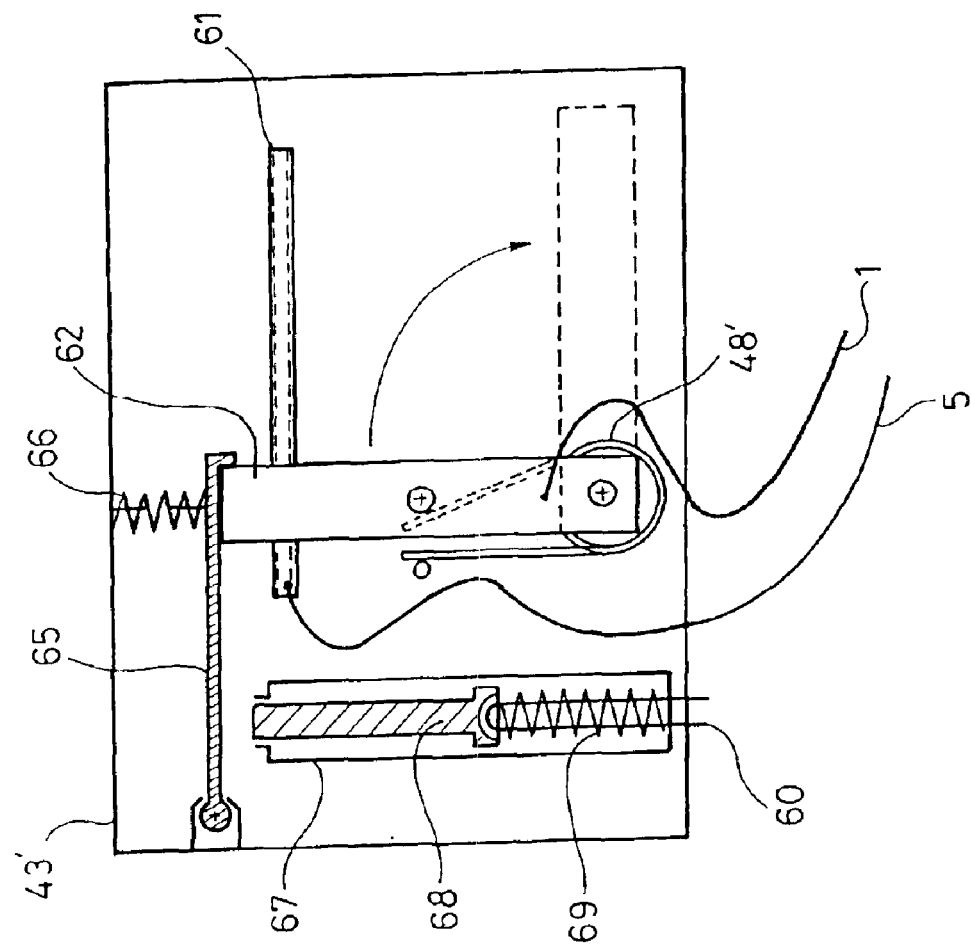
FIG_4

PROTECTION SYSTEM FOR PROTECTING A POLY-PHASE DISTRIBUTION TRANSFORMER INSULATED IN A LIQUID DIELECTRIC, THE SYSTEM INCLUDING AT LEAST ONE PHASE DISCONNECTOR SWITCH

The invention relates to a protection system for protecting a distribution transformer insulated in a liquid dielectric.

BACKGROUND OF THE INVENTION

In a distribution transformer having liquid dielectric, in the event of a fault there is a risk of the dielectric overheating, thereby giving rise to excessive pressure that can reach a value so high that the transformer explodes. There is then a risk that the dielectric might be sprayed around, with serious consequences on the environment.

French Patent Application FR2801141 describes a protection system making it possible to prevent the transformer from exploding. In that protection system for protecting a three-phase distribution transformer immersed in a liquid dielectric contained in a tank, two of the three phases are equipped on the high-voltage side of the transformer with respective current-limiting fuses, and with respective protection micro-fuses disposed in series with the corresponding current-limiting fuse, each of said micro-fuses detecting abnormal current conditions and being associated with a striker.

That system further comprises at least one fault detector for detecting faults on the basis of at least one of the following indicators: pressure in the tank, and level of the dielectric. It further comprises a short-circuiter situated on the high voltage side between the current-limiting fuses and the high-voltage windings of the transformer, said short-circuiter being capable of being triggered directly by the fault detector, or else by the striker associated for example with each micro-fuse, and in the event of the micro-fuse operating. On the high-voltage side of the transformer and upstream from the short-circuiter, the third phase is equipped with a micro-switch associated with a striker triggering the short-circuiter in the event of the micro-switch operating.

The micro-switch is equivalent to a micro-fuse provided with an isolating function, and said micro-switch has a calibrated conductive blade for triggering the interruption of fault currents between the third phase and the tank of the grounded transformer.

However, in the event of a series of relatively exceptional circumstances, it is possible that a grounded residual fault current which is greater than the interruption threshold of the micro-switch subsists in the third phase. Under such circumstances, the transformer windings are no longer isolated.

OBJECTS AND SUMMARY OF THE INVENTION

An object of the invention is to improve that protection system so as to ensure that the windings are isolated under all circumstances.

To this end, the invention provides a protection system for protecting a distribution transformer having N phases, the transformer being immersed in a liquid dielectric contained in a tank, in which at least N-1 phases are equipped on the high-voltage side of the transformer with respective current-limiting fuses capable of blowing in the event of a dead short circuit between the phases, the system comprising:

at least one fault detector for detecting faults on the basis of at least one of the following indicators: pressure in the tank, level of the dielectric, or temperature of the transformer;

a short-circuiter acting on all the phases situated upstream from the high-voltage windings, said short-circuiter being capable of being triggered by said fault detector to establish a dead short circuit between the phases; and on at least N-1 phases, a detector for detecting an abnormal current upstream from the transformer, said detector being associated with control means for controlling the triggering of said short-circuiter, wherein at least the phase that is not equipped with a limiting fuse is equipped with a disconnector switch which is normally closed in the absence of any fault, said disconnector switch being disposed on the high-voltage side of the transformer upstream from the short-circuiter, and opening thereof being triggered by the short-circuiter in the event of a fault, but with a certain delay relative to the triggering of the short-circuiter itself.

Disconnector switch opening is triggered mechanically or electrically by movement of the short-circuiter.

After the disconnector switch(es) has(have) been opened, all of the conductors and connections of the high-voltage windings of the transformer are isolated from the network.

In a particular embodiment of the protection system of the invention, the system is three-phase and comprises two current-limiting fuses. At least the phase that is not equipped with a limiting fuse is equipped with a disconnector switch, each of said fuses equipping a respective other phase, and opening of the disconnector switch being triggered by the short-circuiter so that the phase of said switch (39) is isolated only after said fuses have been blown by the short-circuiter. In the embodiment described in FIG. 1, only the phase that is not equipped with a limiting fuse is equipped with an disconnector switch.

In another particular embodiment of the protection system of the invention, the system comprises, for each phase, a current-limiting fuse in series with a disconnector switch, with a detector for detecting an abnormal current being installed on each of at least N-1 phases.

In a particular embodiment of the protection system of the invention, the disconnector switch includes two terminals spaced apart form each other and connected respectively to the third phase and to the short-circuiter. The two terminals of the disconnector are interconnected via an electrically-conductive slidably-mounted rod that is moved in translation or in rotation under the action of a spring relaxing in sequence with opening of the short-circuiter. The disconnector switch further includes a removable pin which prevents said rod from moving, and which is connected mechanically to a moving portion of the short-circuiter so as to be released when the short-circuiter operates. The disconnector switch may also be triggered by means of a mechanical system of the striker type, itself actuated by means of an electrical contact being established under actuation of the short-circuiter. In addition, a first terminal of the disconnector switch is connected directly to a high-voltage power supply phase. The disconnector is organized so that said first terminal remains in electrical contact with the rod during a portion of the translation or rotation stroke of the rod, so as to guarantee isolation only after the current-limiting fuses are blown completely on the other two phases.

In yet another particular embodiment of the protection system of the invention, the rod is disposed inside a housing provided with vents. The housing is normally filled with the dielectric, and the vents make it possible to avoid excessive internal pressure when the dielectric expands in the normal operating stages of the transformer. In addition, the vents makes it possible to remove gases that can form when the rod slides, and also to fill the housing under a vacuum with the dielectric contained inside the tank.

In yet another embodiment, the disconnector switch is based on a rotary device comprising a fixed contact and a rotary moving contact. In this embodiment, the rotary moving contact remains in electrical contact with the fixed contact for a portion of the rotation so that the electrical opening takes place with a delay relative to the start of rotation of the moving contact.

BRIEF DESCRIPTION OF THE DRAWINGS

Embodiments of the protection system of the invention are described below with reference to the drawings, in which:

FIG. 1 very diagrammatically shows an embodiment of a protection system of the invention;

FIG. 2 shows a first embodiment of a disconnector switch equipping the protection system of the invention, the disconnector switch being shown in the closed position;

FIG. 3 shows the disconnector switch of FIG. 2 in the fully-open position;

FIG. 4 shows a second embodiment of the disconnector switch equipping the protection system of the invention; and FIG. 5 is a profile view of the second embodiment of the disconnector of the protection system of the invention.

MORE DETAILED DESCRIPTION

The transformer shown in FIG. 1 may, for example, be a 20/0.410 kilovolt (kv) transformer. Reference 1 designates the delta high-voltage winding and reference 2 designates the star low-voltage winding. The high-voltage winding 1 is powered via the three phases 3, 4, and 5 which penetrate in leaktight manner via insulating feedthroughs 7, 8, and 9 into the tank of the transformer, which is diagrammatically represented by a rectangle 6.

The low-voltage winding 2 feeds the phase lines 10, 11 and 12 by passing through the tank 6 in leak-tight manner via insulating feedthroughs 13, 14, and 15, and similarly, the neutral point 16 is connected to a neutral conductor 17 passing through the tank in leaktight manner via an insulating feedthrough 18.

On the high-voltage side, two of the three phases (the phases referenced 3 and 4 in this example) are connected to the high-voltage winding 1 via respective current-limiting fuses 19 and 20.

These fuses function normally above a current referred to as the "fuse-blowing current" Ic, e.g. 60 amps. Below that current, there is a critical current range, e.g. from 36 amps to 60 amps, within which the fuse overheats, is degraded, but does not blow as easily. In order to protect the fuses against such malfunctioning within the critical current range, each current-limiting fuse 19, 20 is associated in series with a respective micro-fuse 21, 22 that is faster than the current-limiting fuse and that is constituted by a short silver blade, e.g. low-voltage type fuses. Its role is to obtain melting for currents within the critical current range of the current-limiting fuse, with good accuracy, or at least to offer resistance that is sufficiently high in said critical currant range for the current to be diverted onto a parallel circuit. Each micro-fuse is associated with a respective striker 23 and 24 connected in parallel.

Such a striker is known per se. It is constituted by a finger pushed by a spring that is maintained in the loaded state by a steel wire. The steel wire, shown at 25 and 26, is connected in parallel with the micro-fuse 21, 22. The steel wire of the striker has resistance that is much higher than the resistance of the silver blade of the micro-fuse, so that, under normal operating conditions, the current passes through the silver blade, thereby avoiding subjecting the steel wire to aging. In the event of a current surge, in the calibrated range corresponding to the critical range, the silver blade melts, thereby diverting the current towards the steel wire which also melts, thereby releasing the finger 27, 28 of the striker.

By being released, the finger of a striker triggers a three-phase short-circuiter 29, 30, 31 so as to close it. This operation C is performed via any arbitrary mechanical trigger system, represented in dashed lines. The system includes a pressure detector 32 which also triggers the short-circuiter 29, 30, 31 in the event that the pressure of the dielectric liquid exceeds the value set for the sensor. A system for detecting when a temperature threshold is exceeded at one or more representative points of the transformer, or even a level detector 33 for detecting the level of the dielectric liquid in the transformer can also supplements the protection system.

In the event that the level of the dielectric liquid falls below a safety threshold, or in the event that a temperature threshold is exceeded, the detector 33 which, for example, may be constituted merely by a float, or even a temperature sensor which, for example, may be constituted by a simple bimetallic strip, causes a contact 34 to close. Said contact thus closes a circuit including a striker 35 whose steel wire 36 is connected in parallel between the neutral point 16 and a phase 12. If necessary, a current-limiting resistor 37 is inserted in the circuit. The contact 34 closing causes a current to flow through the circuit, thereby causing the steel wire 36 of the striker 35 to melt, thereby releasing its finger and causing the short-circuiter 29, 30, 31 to close.

Thus, in the event that a fault appears, such as a current surge, a pressure surge, or a leak from the tank resulting in the level of the dielectric liquid falling by a determined value, a dead short-circuit is caused between the three high-voltage phases 3, 4, and 5 and a point situated between the fuses 19, 20 and the high-voltage winding 1, thereby immediately causing the fuses 19 and 20 to blow. The first and second phases 3 and 4 are then isolated from the high-voltage winding 1.

Unlike the structure known from French Patent Application FR2801141, the third phase 5 is equipped, on the high-voltage side of the transformer and upstream from the short-circuiter 29, 30, 31, with a disconnector switch 39 which is normally closed in the absence of any fault, and opening of which is triggered mechanically or electrically by the movement of the short-circuiter when a fault appears in the tank 6. Thus, all of the high-voltage windings 1 of the transformer are certain to be disconnected in the event of a fault.

In the embodiment shown in FIG. 1, in which a single phase is equipped with a disconnector switch, the disconnector switch 39 is designed to open with a certain delay relative to the instant at which the short-circuiter is triggered so that said phase is isolated only after the current-limiting fuses on the other phases have blown.

However, the invention is not limited to that embodiment and it is possible to equip each phase with a respective disconnector switch on the high-voltage side upstream from the short-circuiter, which switch is itself in series with a current-limiting fuse situated upstream or downstream therefrom. A detector, such as a micro-fuse 21 or 22, for detecting abnormal current upstream from the transformer can thus equip each phase and be associated with control means, such as a striker 23 or 24, for controlling the short-circuiter. In such an embodiment (not shown), the disconnector switches all open simultaneously from the instant at which the short-circuiter is triggered. This disposition is particularly suitable for systems other than three-phase systems, such as two-phase systems, or even networks with neutral grounded.

A disconnector switch 39 has two terminals 40, 41 spaced apart from each other and connected respectively to the third phase and to the short-circuiter. The two terminals are connected together via an electrically-conductive slidably-mounted rod 42 shown in FIG. 2 and which moves in translation to interconnect or to separate the terminals 40, 41.

As shown in FIG. 2, the slidably-mounted rod 42 is disposed axially in a housing 43 made of an electrically insulating material, and cylindrical in shape in this example. The housing is closed at its two ends by respective covers through which the terminals 40, 41 pass. The terminal 40 is connected electrically to an annular sliding electrical contact 45 through which one end of the rod 42 passes and which is held in fixed manner in the housing by an electrically-insulating spacer 46. The contact 45 is disposed in the vicinity of the cover 44. The terminal 41 is connected via a flexible conductor 47 to the other end of the rod 42, which end is closer to the cover 54. The inside of the housing 43 forms a bore through which the rod 42 passes and in which a spring 48 is disposed that has one end in abutment against the end wall of the bore, and its other end in abutment against a washer 49 that is fixed around the rod 42. A hydraulic damper is advantageously disposed on the initial portion of the stroke over which the rod 42 moves. The end of the rod 42 closer to the cover 44 is provided with a transverse recess 50 into which a removable pin 51 penetrates. The pin 51 extends radially outwards from the housing 43 via an opening 52 in the housing.

When the disconnector switch is in its closed position, the spring 48 is loaded between the washer 49 and the end wall of the bore, the rod 42 penetrates into the contact 45, and the pin 51 penetrates into the rod 42, thereby preventing it from moving axially inside the housing 43. The rod 42 electrically interconnects the two terminals 40 and 41 via the contact 45 and via the conductor 47. When the pin 51 is released from the rod 42 by traction being exerted towards the outside of the housing 43, as indicated by the arrow in FIG. 3, the spring 48 relaxes and drives the rod 42 in translation towards the cover 54, thereby causing the contact 45 and the rod 42 to separate. At the end of the stroke of the rod 42, the two terminals 40 and 41 are electrically isolated by a disconnection distance y that is sufficient, as shown in FIG. 3.

As shown in FIG. 2, that end of the rod 42 which is closer to the cover 44, when the disconnector switch 39 is in the closed position, penetrates into the contact 45 over a distance x that is sufficient so that, when the pin 51 is released from the rod 42, the time during which the rod 42 moves under the action of the spring relaxing and is slowed by the action of the hydraulic damper, while remaining in electrical contact with the contact 45 is significantly greater than the time necessary for the current-limiting fuses 19, 20 to blow, as measured from the instant at which the short-circuiter is triggered.

For example, the pin 51 may be connected mechanically to a moving portion of the short-circuiter, which portion is moved when the short-circuiter operates.

The housing 43 is normally filled with the dielectric contained in the tank, and it is provided with vents such as the opening 52 or the opening 53 enabling it to be filled with the dielectric, or enabling gas at excess pressure to be removed. When the disconnector switch is disposed in the tank filled with dielectric, it is preferable for the vents 52, 53 to be disposed in the top of the housing 43 so as to prevent the dielectric from draining out of the housing 43 in the event that the tank 6 leaks.

In a variant, the disconnector switch 39 may be implemented on the basis of a rotary device mounted in a housing 43' shown in FIG. 4. This device comprises a fixed contact 61 connected to the third phase 5 of the high-voltage power supply, and a rotary moving contact 62 connected to the high-voltage windings 1.

In the embodiment given in FIG. 4, the fixed contact is a tube disposed between two substantially parallel plates forming the moving contact. The plates are mounted to rotate about an axis remote from the tube and perpendicular to said tube. When the disconnector switch is opened, the spring 48' drives the plates in rotation, while they remain in electrical contact with the tube for a portion of the rotary stroke, thereby delaying opening of the disconnector switch by a certain duration. As shown in FIG. 5, the two plates 62 are held in abutment against the conductor tube by a presser spring 63 situated substantially midway along the plates. With this configuration, the opening delay can be adjusted by modifying the force exerted by the presser spring 63 on the plates 62.

When the disconnector switch 39 is in the closed position, the free ends of the plates 62 are retained by a locking member, which, in this example, is a hinged arm 65 preventing them from rotating. In this embodiment, the hinged arm 65 is locked to the plates under the action of a holding spring 66, and it is unlocked by an unlocking member which, in this example, is a striker acting on the arm against the action of the spring 66. When the striker is actuated, the hinged arm is moved, thereby releasing the plates 62 and causing the disconnector switch to open.

The striker may be actuated mechanically or electrically by the short-circuiter 29, 30, 31. In the example shown in FIG. 4, the striker is actuated electrically by the short-circuiter. As explained above, such a striker comprises a finger 68 mounted to slide inside a body 67. The finger 68 abuts against a trigger spring 69 while being retained by a steel wire 60. When current is applied to it via the short short-circuiter, the steel wire 60 melts, thereby releasing the finger 68. The finger 68 then moves under the action of the spring 69 to push the hinged arm.

What is claimed is:

1. A protection system for protecting a distribution transformer having N phases, the transformer being immersed in a liquid dielectric contained in a tank, in which at least N-1 phases are equipped on the high-voltage side of the transformer with respective current-limiting fuses capable of blowing in the event of a dead short circuit between the phases, the system comprising:

at least one fault detector for detecting faults on the basis of at least one of the following indicators: pressure in the tank, level of the dielectric, or temperature of the transformer;

a short-circuiter acting on all the phases situated upstream from the high-voltage windings, said short-circuiter being capable of being triggered by said fault detector to establish a dead short circuit between the phases; and on at least N-1 phases, a detector for detecting an abnormal current upstream from the transformer, said detector being associated with control means for controlling the triggering of said short-circuiter, wherein at least the phase that is not equipped with a limiting fuse is equipped with a disconnector switch which is normally closed in the absence of any fault, said disconnector switch being disposed on the high-voltage side of the transformer upstream from the short-circuiter, and opening thereof being triggered by the short-circuiter in the event of a fault, but with a certain delay relative to the triggering of the short-circuiter itself.

2. A three-phase protection system according to claim 1, comprising two current-limiting fuses and in which at least the phase that is not equipped with a limiting fuse is equipped with a disconnector switch, each of said fuses equipping a respective other phase, and opening of the disconnector switch being triggered by the short-circuiter so that the phase of said switch is isolated only after said fuses have been blown by the short-circuiter.

3. A protection system according to claim 1, comprising, for each phase, a current-limiting fuse in series with a disconnector switch, with a detector for detecting an abnormal current being installed on each of at least N-1 phases.

4. A protection system according to claim 1, in which opening of the disconnector switch is triggered mechanically by movement of the short-circuiter in the event of a fault.

5. A protection system according to claim 4, in which the disconnector switch includes: a first terminal connected to the third phase of the high-voltage power supply; and a second terminal connected to the high-voltage windings and to the short-circuiter; said first and second terminals being interconnected via an electrically-conductive slidably-mounted rod that is moved in translation under the action of a spring relaxing when opening of the short-circuiter is triggered; and a removable pin which prevents said rod from moving, and which is connected mechanically to a moving portion of the short-circuiter so as to be released when the short-circuiter operates, the first terminal being held in electrical contact with the rod during a portion of the translation stroke of the rod.

6. A protection system according to claim 5, in which the electrical contact between the first terminal and the slidably-mounted rod is maintained by a fixed sliding contact which is connected electrically to the first terminal, which is annular in shape, and through which an end of the slidably-mounted rod passes.

7. A protection system according to claim 5, in which the rod is disposed inside a housing provided with vents, the housing normally being filled with the dielectric.

8. A protection system according to claim 1, in which the disconnector switch includes:

a fixed contact connected to the phase that said switch equips in the high-voltage power supply;

a rotary moving contact connected to the high-voltage windings;

a spring acting on the moving contact to rotate it;

a locking member which prevents the moving contact from rotating; and an unlocking member which is actuated by the short-circuiter to act on the locking member to release the moving contact, said moving contact being put into electrical contact with said fixed contact during a portion of its rotary stroke.

9. A protection system according to claim 8, in which the unlocking member is a striker actuated electrically by the short-circuiter.

10. A protection system according to claim 8, in which the fixed contact is a tube, and in which the rotary moving contact is formed by two substantially parallel plates, said tube being disposed between said plates.

11. A protection system according to claim 1, in which each detector for detecting an abnormal current consists of a protection micro-fuse, each micro-fuse being disposed in series with a current-limiting fuse and being faster than said current-limiting fuse.

12. A protection system according to claim 11, in which each micro-fuse is associated with a striker capable of triggering said short-circuiter when said micro-fuse operates.

* * * * *